April 27, 1937.  A. H. CUDDON-FLETCHER  2,078,723
ROTARY CYLINDRICAL VALVE
Filed March 31, 1936   3 Sheets—Sheet 1
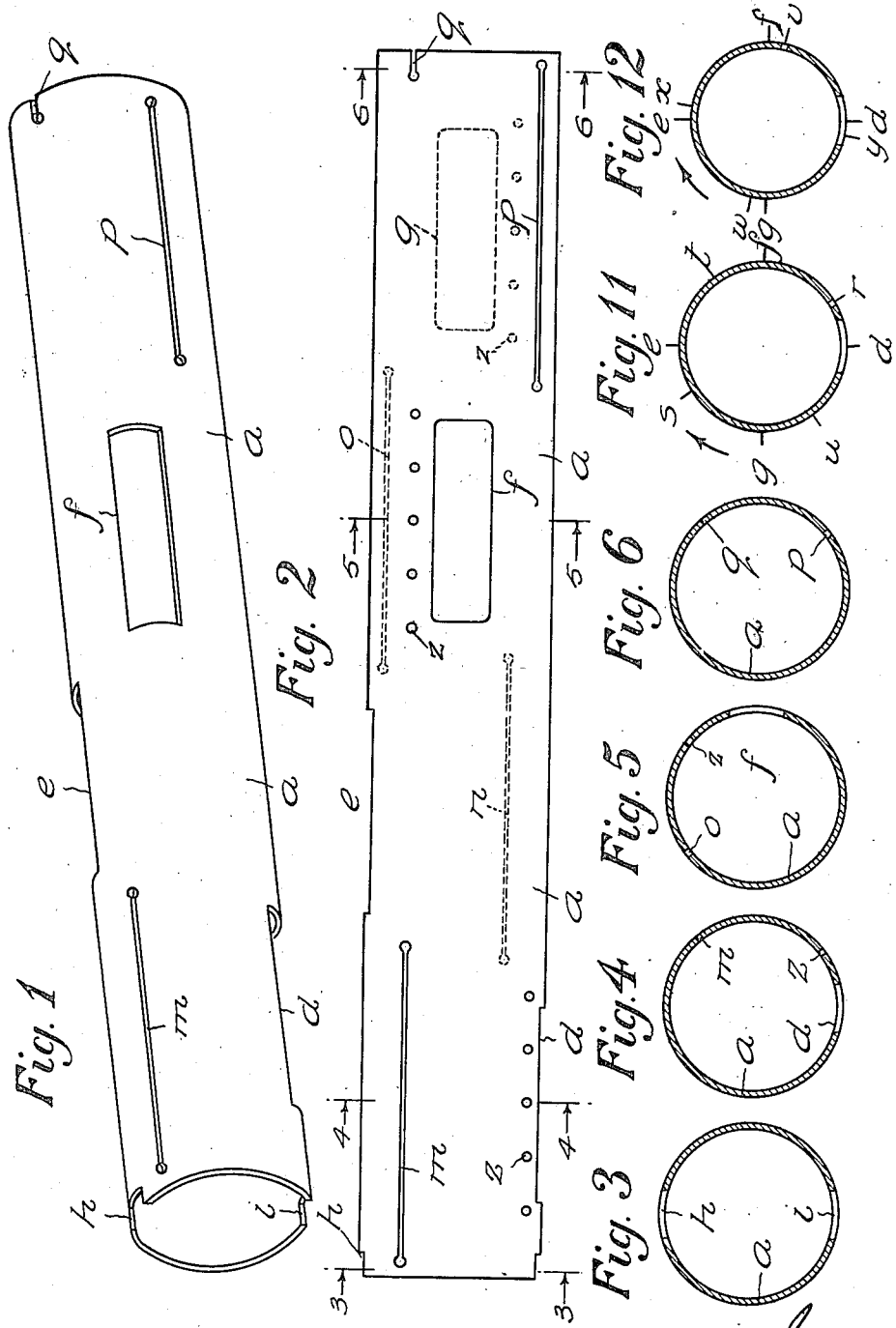

April 27, 1937.    A. H. CUDDON-FLETCHER    2,078,723
ROTARY CYLINDRICAL VALVE
Filed March 31, 1936    3 Sheets—Sheet 2
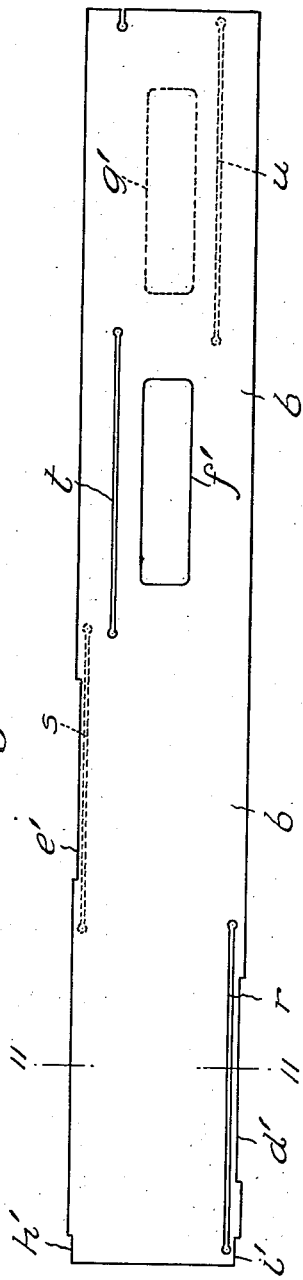
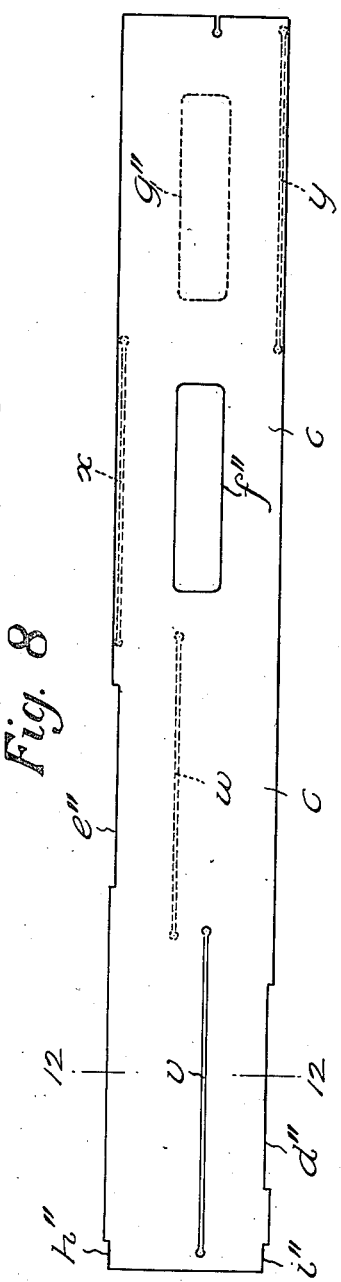

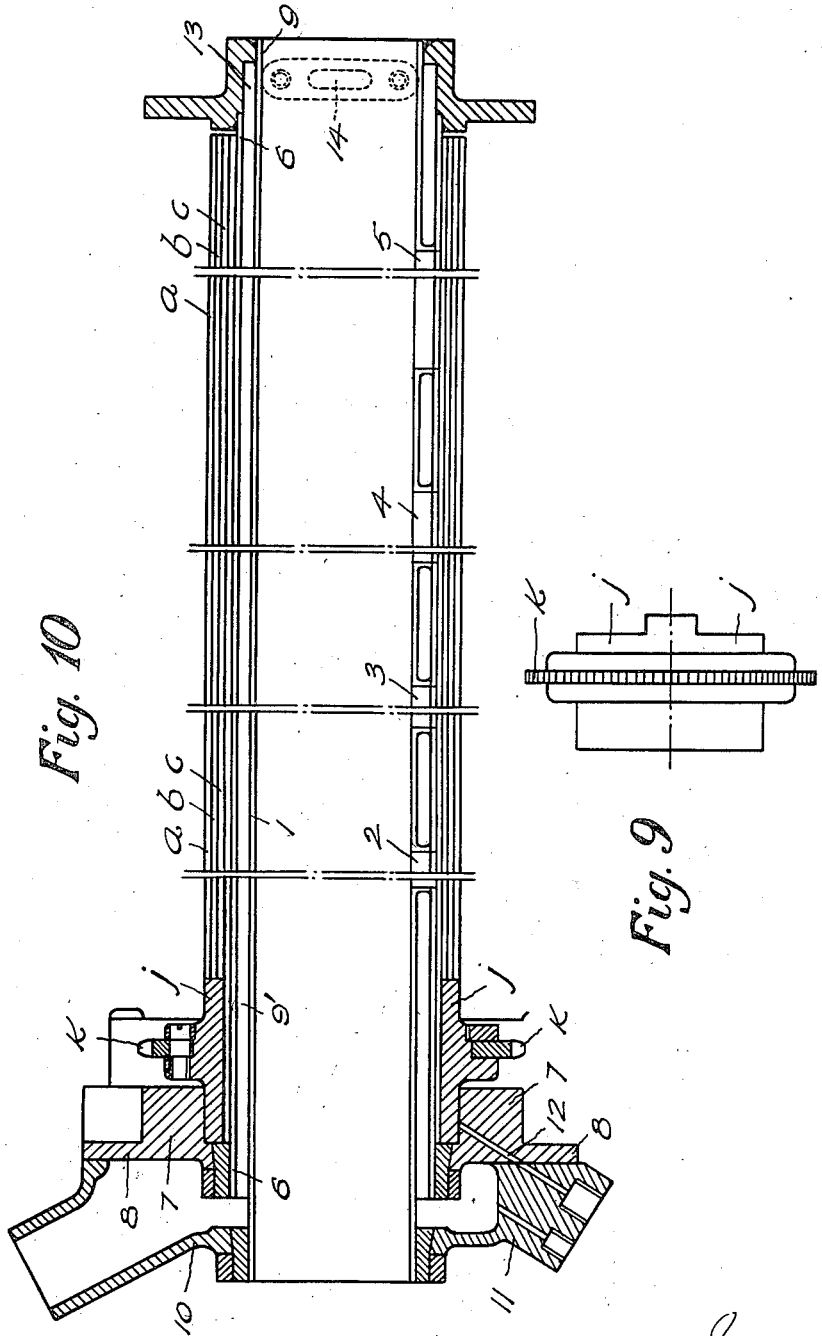

Patented Apr. 27, 1937

2,078,723

UNITED STATES PATENT OFFICE 2,078,723

ROTARY CYLINDRICAL VALVE

Angus Humphrey Cuddon-Fletcher, Somerton Hall, near Great Yarmouth, England

Application March 31, 1936, Serial No. 71,944
In Great Britain October 19, 1934

5 Claims. (Cl. 123—59)

The invention relates to rotary valves of the kind in which the valve is provided with ports through the wall which are brought by its rotation into and out of register with ports in an engine cylinder or cylinders for the admission of fluid or gaseous mixtures to the cylinder or cylinders or permitting exhaust therefrom.

Where a cylindrical valve working in a fixed bearing sleeve or bore is exposed to substantial changes of temperature it has hitherto been practically impossible to obtain satisfactory results as the valve must be a good working fit when cold if it is to be liquid or gas-tight under pressure, and a good working fit when cold does not allow sufficient clearance for the increase in the dimensions of the valve when hot.

This is particularly so in the case of rotary cylindrical valves employed in internal combustion engines when the valve must work within a very wide range of temperatures.

According to my invention a cylindrical valve of the kind referred to is formed by two or more concentric cylindrical sleeves which are a light-push fit in each other and each is longitudinally slotted or otherwise cut away to permit it to expand and contract circumferentially under changes of temperature, the slits or cut-away portions in the sleeves being out of register to a sufficient extent to prevent any passage between the sleeve of the fluid which is being distributed or controlled.

The provision of one or more longitudinal slots or gaps in each sleeve permits the remainder of the sleeve to expand or contract in a circumferential direction, the edges of the metal on each side of the slot approaching or receding from each other while the diameter of the sleeve remains substantially constant.

In a valve of considerable length, having ports disposed in various angular positions along it for communicating with ports in the various cylinders of a multi-cylinder engine, it will usually be preferable to have a number of discontinuous slots or gaps spaced circumferentially but arranged with the end of one either in line with or overlapping the beginning of the next.

In some previous proposals for the construction of rotary valves for internal combustion engines, the cylindrical valve has been provided with passages for the circulation of a cooling medium or a distributing casing around which the valve rotates has been cooled in this way.

A convenient embodiment of my rotary valve includes in combination with it an arrangement of an internal, hollow, double walled, ported cylinder about which and with very small clearance the valve sleeves are arranged to rotate.

The appended drawings show a preferred constructional embodiment of the valve sleeves forming the rotary valve, and also a cooling arrangement in combination with it.

Figure 1 is a perspective view of the outer sleeve of a three sleeve rotary valve.

Figure 2 is an elevation thereof.

Figures 3, 4, 5, and 6 are cross sections on lines 3—3, 4—4, 5—5, and 6—6 respectively of Figure 2.

Figure 7 is an elevation of the intermediate sleeve, and

Figure 8 is a similar view of the inner sleeve.

Figure 9 is a plan view of a driver ring for the sleeves.

Figure 10 is a sectional view showing the sleeves assembled around a ported, hollow, cooling member.

Figures 11 and 12 are respectively sections on line 11—11 of Figure 7 and 12—12 of Figure 8 indicating diagrammatically the relations of slots to the ports in the two sleeves shown in Figures 7 and 8.

In this embodiment I employ three thin sleeves as the rotary valve. The outer one, $a$, Figures 1 to 6, receives an intermediate sleeve $b$, Figure 7, which is a light push-in fit within it; and the sleeve $b$ receives the inner sleeve $c$ as a light push-in fit within it. The positions of the corresponding ports $d$, $e$, $f$ and $g$ in sleeve $a$; $d'$, $e'$, $f'$, $g'$ in sleeve $b$; and $d''$, $e''$, $f''$, $g''$ in sleeve $c$ are the same in each sleeve and the driving slots $h$, $h'$, $h''$ and $i$, $i'$, $i''$ in the respective sleeves $a$, $b$ and $c$ which receive dogs $j$ projecting inwardly from a toothed ring $k$ (Figure 9) are the same.

The ports $d$, $e$, $f$ and $g$ etc. correspond in their positions longitudinally of the sleeves with the ports (not shown) in the bore or casing in which the sleeves work which lead to the engine cylinders (not shown), so that as the valve sleeves rotate bodily as a single rotary valve gases are admitted to or discharged from the cylinders through the ports and through the hollow valve.

The discontinuous expansion slots which I provide along each sleeve are placed so as to be out of register in the different sleeves, so that there can be no leakage of gas pressure between the sleeves. Further, any tendency to deformation of the one sleeve due to the position of the slot in relation to the direction of the thrust is resisted by another sleeve in which the expansion slot is in a different angular position; therefore the sleeves mutually support each other.

The slots in the outer sleeve $a$ are represented by $m$, $n$, $o$ and $p$. They are cut longitudinally at one side of the respective ports $d$, $e$, $f$ and $g$ and extend through the sleeve. They are spaced circumferentially in the same relation as the ports; as here shown their axes are about 131° from the respective port axes. The end of each slot overlaps the near end of the next adjacent one as clearly shown in Figure 2, but the two end slots $m$ and $p$ do not extend to the end of the sleeve. A short slot $q$ extending in from the end of the sleeve about 97° from the slot $p$ allows for the expansion and contraction of this end of the sleeve. A similar provision is unnecessary at the other end, as the end of the main slot $m$ is overlapped by the gaps $h$ and $i$ cut in the end to receive the driving dogs.

The slots are narrow and may for example be about $\frac{1}{16}$th of an inch in width for a sleeve of three inches or less diameter.

The expansion slots $r$, $s$, $t$ and $u$ in the intermediate liner $b$ are the same as the corresponding slots $m$, $n$, $o$, $p$ in liner sleeve $a$, but, as previously stated, their positions in relation to the ports $d'$, $e'$, $f'$, $g'$ differ. These differences in position are clearly seen in Figure 7 and are indicated in Figure 11.

The expansion slots in the inner sleeve $c$ are lettered $v$, $w$, $x$ and $y$ and their positions with respect to ports $d''$, $e''$, $f''$ and $g''$ will be clear from Figures 8 and 12.

A further function of the expansion slots is to act as a distributor for lubricant and to permit lubricant to enter between the sleeves so that their relative circumferential expansion and contraction is facilitated, and the expansion slots in the outer sleeve $a$ also provide scraper edges to scrape any excess of lubricant from the walls of the bore in which the valve works.

If desired, a series of oil distribution holes $z$ about $\frac{1}{8}''$ diameter may be drilled over each port $d$, $e$, $f$ and $g$ in the outer sleeve $a$ as illustrated in Figure 2. These serve to permit oil to reach the intermediate sleeve $b$ to lubricate the sleeves $a$ and $b$ so that expansion and contraction thereof is facilitated and to permit oil to pass through the slots in sleeve $b$ to distribute oil evenly behind each port therein and over the surface of the bearing or bore $l$ (see Fig. 10) around which the valve rotates.

The driving dogs $j$ on the toothed sleeve $k$ shown in Figure 9 position the three sleeves $a$, $b$ and $c$ in relation to each other by engagement with the driving slots $h$, $i$, $h'$, $i'$, and $h''$, $i''$ respectively therein and about three thousandths of an inch clearance is allowed between each dog and its slot for a dog of three quarters of an inch in width. As the outer sleeve is housed in a bore in the engine provided with fixed ports leading to the cylinders, no relation between the driving sleeve $k$ and the sleeves other than for rotational movement is necessary.

In the arrangement illustrated in Figure 10 a double walled tube 1, having an inner wall 9, intermediate space 9' and outer wall 6. Said tube also has ports 2, 3, 4, and 5 corresponding to the ports in the bearing or bore in the cylinder head (not shown) in which the rotary valve works. Said tube is combined with the three sleeves $a$, $b$, $c$ which form the rotary valves. The inner sleeve $c$ surrounds the double wall tube 1 with a small clearance say of the nature of five to seven thousandths of an inch.

The double walled tube 1 forms a cooling lining and where the valve is arranged to work horizontally, the outer wall 6 of the tube 1 extends through the bearing 7 of the valve and through a jointing plate 8 to which it is suitably secured. The inner wall 9 extends beyond the jointing plate 8 and is suitably jointed to a cooling fluid supply casing 10 surrounding it. The cooling fluid supply casing 10 is connected with the cooling system of the engine.

The chamber in the casing 10 is of larger diameter than the inner wall 9 of the tube 1 so that a well is provided in the bottom of the casing from which an outlet 11 closed by a suitable plug may be arranged for draining purposes. The jointing ring or plate 8 as shown provides the bearing 7 for the driving ring of the rotary valve and this bearing preferably carries a passage 12 for lubricating said bearing. At the opposite end of the tube 1 the inner wall 9 may be carried beyond the outer wall 6 into a flanged chamber 13 in the casting, the exterior of which chamber is provided with an outlet 14 which completes the connection between the space 9' in the tube 1 to the cooling system of the engine.

I claim:

1. Improved rotary valve for internal combustion engines comprising in combination a plurality of sleeves fitting one within another each sleeve having port apertures in corresponding positions, means for rotating the sleeves as a composite valve, each of said sleeves having expansion absorbing slots extending therealong, the slots in each sleeve being short, but extending collectively for substantially the whole length of the sleeve, and the slots in one sleeve being out of register with those in another sleeve.

2. Improved rotary valve for internal combustion engines comprising in combination a plurality of sleeves fitting one within another and each having a plurality of port apertures in corresponding positions, means for rotating the sleeves as a composite valve, each of said sleeves having short longitudinal expansion absorbing slots arranged around the circumference thereof and extending collectively for substantially the whole length of the sleeve, the slots in the respective sleeves being out of register with those in another sleeve.

3. Improved rotary valve for internal combustion engines comprising in combination a plurality of ported sleeves fitting one within another, means for rotating the sleeves as a composite valve, each of said sleeves having short longitudinal expansion absorbing slots arranged around its circumference and extending collectively for substantially the length of the sleeve and overlapping each other along the length of the sleeve, the slots in the respective sleeves being out of register with each other.

4. Improved rotary valve for internal combustion engines comprising in combination a plurality of sleeves fitting one within another and each having port apertures in correspondng positions, means in each sleeve whereby the composite valve may be rotated, each sleeve of the valve having expansion absorbing slots extending therealong, the slots in the respective sleeves being out of register with each other and the slots in each sleeve being short and displaced around the sleeve, but overlapping each other along the length of the sleeve, said slots terminating short of the ends of the sleeve, and each sleeve having additional slots extending in from the end to allow for the expansion and contraction of this portion of each sleeve.

5. Improved rotary valve for internal combustion engines comprising in combination three sleeves of which the intermediate one is a light-push-in fit in the outer and the inner one is a similar fit in the intermediate sleeve, the sleeves each having a number of coincident ports and each having circumferentially displaced longitudinally directed expansion absorbing slots one for each port in each sleeve, the slots in the three sleeves being also displaced circumferentially relative to one another.

ANGUS HUMPHREY CUDDON-FLETCHER.